United States Patent
Rabinovici et al.

(10) Patent No.: US 7,401,191 B1
(45) Date of Patent: Jul. 15, 2008

(54) SYSTEM AND METHOD FOR PERFORMING DISK WRITE OPERATIONS BY WRITING TO A DATA DEPOT PRIOR TO AN IN-PLACE WRITE

(75) Inventors: Sorana Rabinovici, Woodland Hills, CA (US); Steven B. Cohen, Redondo Beach, CA (US)

(73) Assignee: NCR Corp., Dayton, OH (US)

( * ) Notice: Subject to any disclaimer, the term of this patent is extended or adjusted under 35 U.S.C. 154(b) by 573 days.

(21) Appl. No.: 10/857,790

(22) Filed: May 28, 2004

(51) Int. Cl.
*G06F 13/00* (2006.01)

(52) U.S. Cl. .................... 711/162; 711/155; 711/156; 711/168; 714/6

(58) Field of Classification Search ............ 711/161, 711/162, 155, 156, 165, 168; 714/6
See application file for complete search history.

(56) References Cited

U.S. PATENT DOCUMENTS

| | | | |
|---|---|---|---|
| 5,870,599 A * | 2/1999 | Hinton et al. | 712/239 |
| 6,708,256 B2 * | 3/2004 | Zahir | 711/141 |
| 6,772,158 B1 * | 8/2004 | Giammaria | 707/10 |
| 6,898,688 B2 * | 5/2005 | Martin et al. | 711/202 |
| 7,127,478 B1 * | 10/2006 | Schoenwolf et al. | 707/204 |
| 2005/0097266 A1 * | 5/2005 | Factor et al. | 711/112 |
| 2005/0122790 A1 * | 6/2005 | Uneo et al. | 365/189.05 |
| 2005/0203874 A1 * | 9/2005 | Lubbers et al. | 707/1 |

* cited by examiner

*Primary Examiner*—Hong Kim
(74) *Attorney, Agent, or Firm*—Baker Botts, LLP

(57) ABSTRACT

Methods, computer programs, information handling systems, and state machines for performing an atomic write to a data block area are disclosed. The atomic write is an in-place write> The method includes receiving one or more data blocks to write to the data block area; and for each data block received: writing the data block to the depot slot; and writing the data block to the data block area after the data block write to the depot slot is completed.

27 Claims, 9 Drawing Sheets

SYSTEM AND METHOD FOR PERFORMING DISK WRITE OPERATIONS BY WRITING TO A DATA DEPOT PRIOR TO AN IN-PLACE WRITE

BACKGROUND

One problem faced when using information handling systems, including database systems, is loss of data written to disk. One cause of disk data loss is known as the interrupted write problem. After an interrupted write, only a portion of the data sent to the disk is written correctly. Interrupted writes may occur during software or hardware initiated restart operations. This situation is problematic because the information handling system may not know that the data was not written successfully, because no processes are running to receive an error message reporting the failed write or an error message was not generated.

One system for handling interrupted writes is a Write Ahead Logging (WAL) system. In general, a WAL system logs write commands that are sent to a disk. In the event of a restart operation, the log is played back to synchronize the disk. In some WAL systems a log of all disk writes is replayed to reconstruct the disk after a failed write.

One method for handling interrupted writes is to disallow in-place writes (e.g., writing over a previous version of data block with a new version of a data block). Disallowing in-place writes provides at least one complete copy of a data block, that is, either the previous version of the data block, the new version of the data block, or possibly both copies of the data block will be intact at any time in the event of an interrupted write.

SUMMARY

In general, in one aspect, the invention features a method of performing an atomic write to a data block area, where the atomic write is an in-place write. The method includes receiving one or more data blocks to write to the data block area. The method includes, for each data block received, writing the data block to the depot slot; and writing the data block to the data block area after the data block write to the depot slot is completed.

Implementations of the invention may feature one or more of the following. The method may include writing all valid data blocks that are in a depot to the data block area during startup. Writing all valid data block that are in a depot to the data block area may include determining which depot slots include valid data blocks. Each data block may include a version that is written to the beginning and to the end of the data block. Determining which depot slots include valid data blocks may include one or more of the following for each depot slot. The determination may include reading and decoding data in the depot slot. The determination may include comparing the version at the beginning of the data block with the version at the end of the data block, and if they are equal determining that the data block is valid. The determination may include, if the version at the beginning of the data block is not equal to the version at the end of the data block determining that the data block is invalid. Each data block may include a stored checksum. Determining whether a data block is valid may include determining a recovery checksum and comparing the recovery checksum with the stored checksum, and if they match, determining that the data block is valid, otherwise, determining that the data block is invalid.

Each data block may include a starting location and length in the data block area. Writing the valid data blocks in the depot to the data block area may include, for each valid data block, writing the data block to the data block area at the starting location.

The method may include characterizing each depot block by an assignment status and a validity status. Characterizing a depot block with an assignment status may include characterizing a depot block as FREE, ASSIGNED, or IN PROGRESS The method may include allocating each data block received to a depot slot. The assignment of any new data block, regardless of whether it will use the depot, may include invalidating zero or more overlapping data blocks in depot slots. The assignment may include choosing a depot slot that has a FREE assignment status and setting the assignment status of the chosen depot slot to ASSIGNED.

Two data blocks may overlap if they would share any location in the data block area. Invalidating zero or more overlapping data blocks may include, for each valid depot slot, if a data block in the depot slot overlaps a new data block, and if the assignment status of the depot slot is FREE, invalidating the depot slot. Invalidating zero or more overlapping data blocks may include, for each valid depot slot, if a data block in the depot slot overlaps a new data block and if the assignment status of the depot slot is ASSIGNED, invalidating the depot slot after the assignment status changes to IN PROGRESS.

The method may include writing the data block to the data block area at the starting location. The method may include setting the assignment status of the depot slot to FREE after all data blocks in the depot slot are completely written to the data block area.

In general, in another aspect, the invention features a computer program that is stored on a tangible storage medium for use in performing an atomic write to a data block area. The atomic write is an in-place write. The computer program includes executable instructions that cause a computer to receive one or more data blocks to write to the data block area. The executable instructions also cause the computer to write the received data block to a depot slot. The executable instruction cause the computer to write the data block to the data block area after the data block write to the depot slot is completed.

In general, in another aspect, the invention features an information handling system that includes one or more controllers, one or more data storage facilities, one or more depots each including one or more depot slots, and a process for execution on one or more of the controllers for achieving atomic writes. Each of the one or more controllers providing access to one or more data storage facilities. The depots stored in one or more of the data storage facilities. One or more data block areas stored in one or more of the data storage facilities. The process includes receiving one or more data blocks to write to the data block area and for each data block received, writing the data block to the depot slot and writing the data block to the data block area after the data block write to the depot slot is completed.

In general in another aspect the invention features a state machine for characterizing the status of one or more depot slots in a depot operable to achieve atomic writes. The state machine includes a validity state and an assignment state for each of one or more depot slots.

Implementations of the invention may feature one or more of the following. A data block may include a location in the data block area. The validity state may represent the equality of a data block in the depot slot with data at the location of the data block in a data block area. The assignment state may represent the availability of a depot slot. The validity state may be selected from the group of validity states consisting of VALID and INVALID. The assignment state may be selected from the group of assignment states consisting of FREE; ASSIGNED; AND IN PROGRESS.

The assignment status may be ASSIGNED in response to the data block being assigned to the depot slot. The assignment state may be IN PROGRESS in response to the data block being written from the depot slot to the data block area. The assignment state may be FREE in response to all data blocks in the depot being completely written to the data block area. The validity status may be INVALID in response to a second data block overlapping the data block. The validity status may be VALID in response to the depot slot being invalidated.

DETAILED DESCRIPTION

Figure 1:
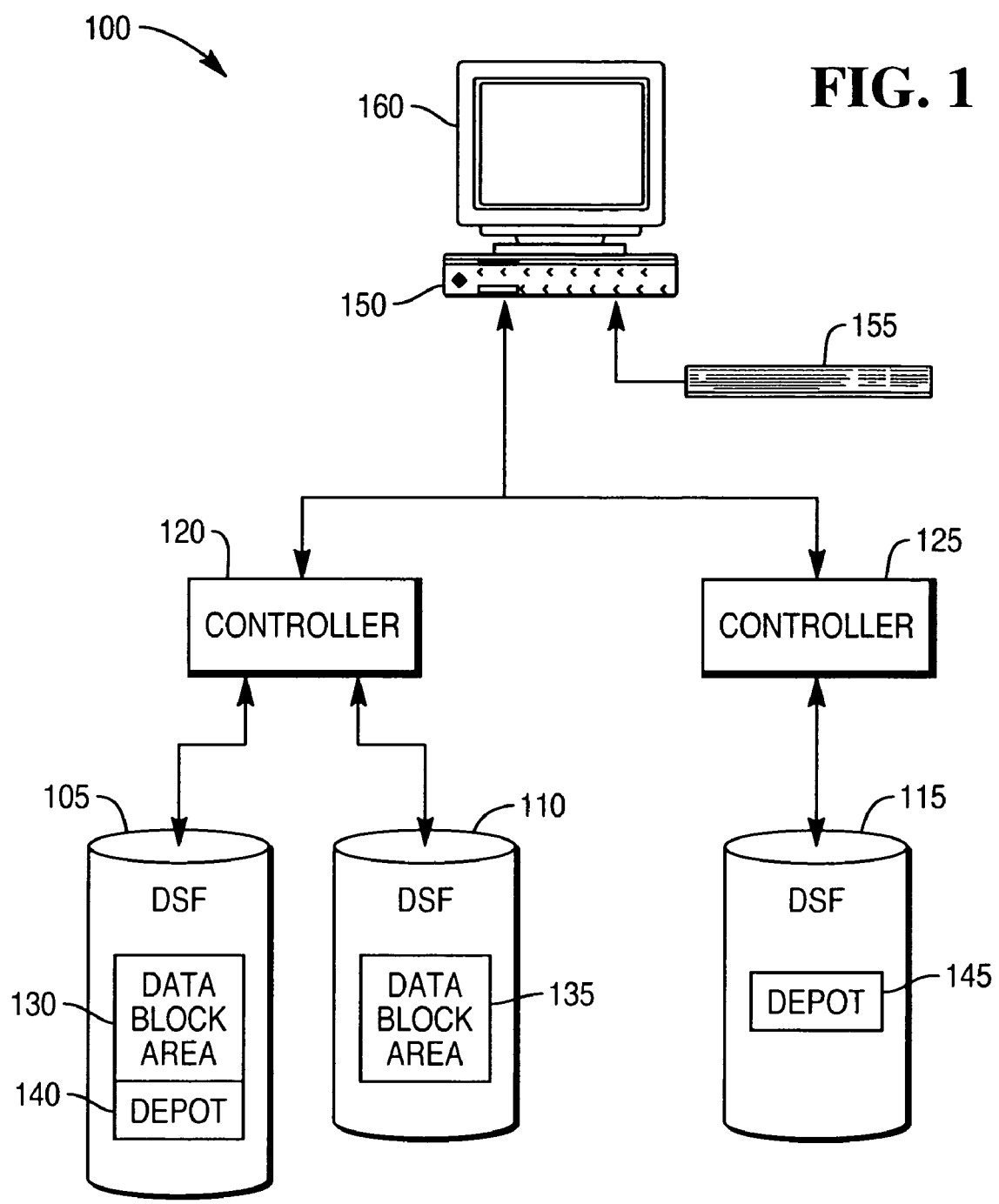
FIG. 1 is a block diagram of an information handling system.

The techniques for achieving atomic writes disclosed herein have particular application, but are not limited, to information handling systems, including, for example, but not limited to database systems. FIG. 1 shows a sample architecture for an information handling system 100. The information handling system 100 includes the data storage facilities (DSFs) (105, 110, and 115). The data storage facilities store and retrieve data from media. One example DSF includes one or more hard disks in an array. Other example DSFs include a single hard drive or another type of media for storing data. DSFs 105 and 110 are controlled by controller 120, while DSF 115 is controlled by controller 125. The controllers 120 and 125 direct the operation of the DSFs 105, 110, and 115. In general, each of the controllers 120 and 125 may control the operation of one or more DSFs. The controller 120 and 125 also control the flow of data into and out of the DSFs 105, 110, and 115.

The controllers 120 and 125 use certain structures stored in the DSFs 105, 110, and 115 to achieve atomic writes. An atomic write either fully writes a data block to the media, or leaves the media in its original state. An atomic write, in the context of an in-place write (i.e., overwriting an existing data block) either fully overwrites the data block or leaves the data block in its original state. These structures include data block areas 130 and 135 in DSFs 105 and 110, respectively. The structures for achieving atomic writes also include depots 140 and 145 in DSFs 105 and 115, respectively. The structure of the data block areas 130 and 135 and depots 140 and 145 is discussed in greater detail below, with respect to FIG. 2. The operation of the controllers, data block areas, and depots is discussed in greater detail below with respect to FIGS. 3-10. In general, however, each DSF may include a data block area for writing data blocks, a depot to ensure atomic writes by performing a type of WAL, or both.

In one example system, each of the depots is associated with one or more data block areas, even if those data block areas are located on different DSFs. In one example information handling system 100, there is a centralized depot for all data block areas. In another example information handling system 100, each DSF includes a depot and a data block area.

The information handling system 100, shown in FIG. 1, also includes a client system 150 to access, process, or manipulate data on the DSFs 105, 110, and 115. The client system 150 communicates with the controllers 120 and 125 to access the DSFs 105, 110, and 115. The client system 150 includes one or more input/output devices, including user interface input/output devices such as keyboard 155 and monitor 160. An example client system 150 includes one or more input/output devices such as a network interface to communicate with, for example, the controller 120 and 125 or other client systems. Yet another example client system 150 does not include user interface input/output devices. Other example information handling systems 100 operate without a client system.

Figure 2:
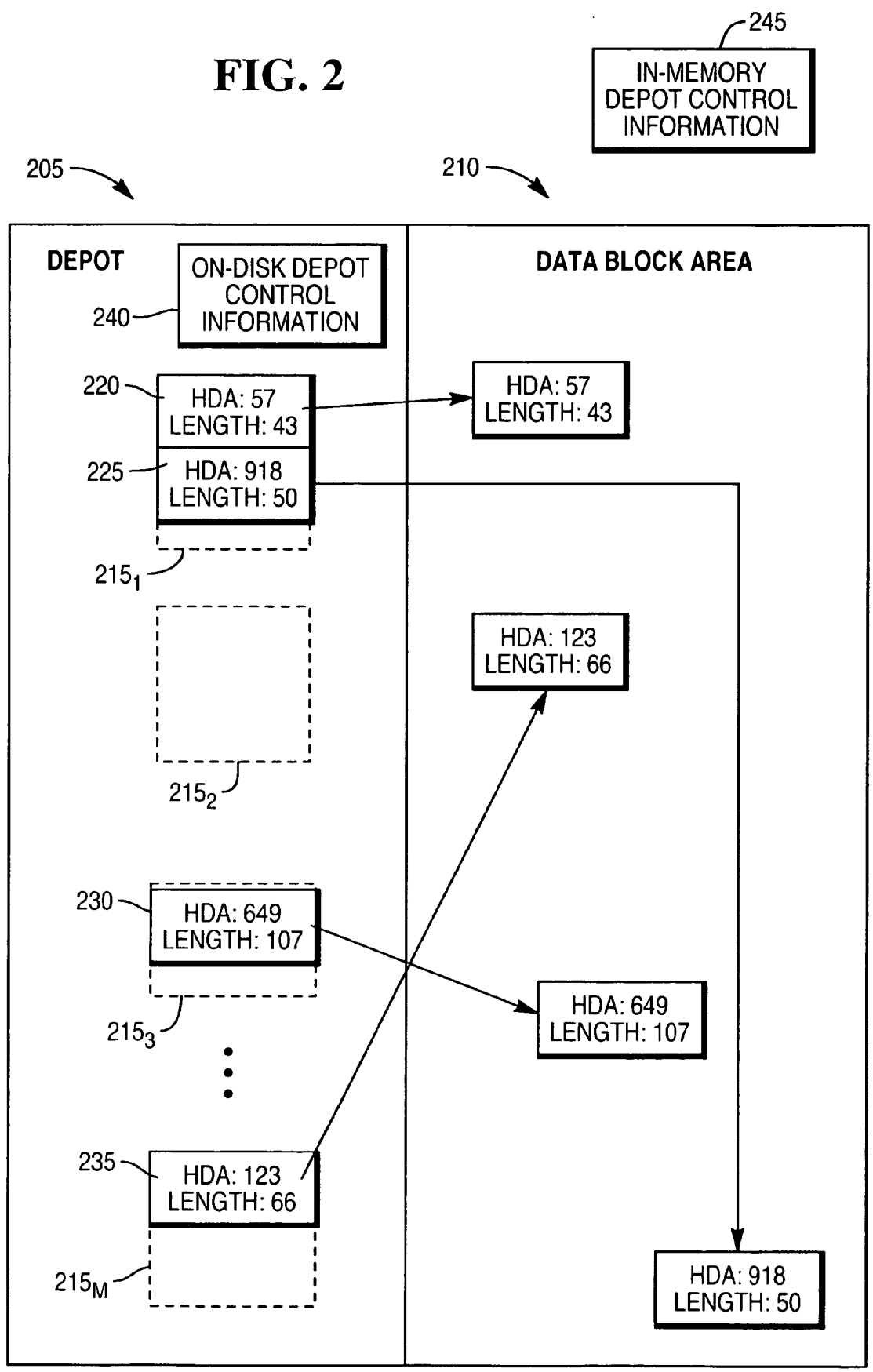
FIG. 2 is a block diagram of a depot and a data block area.

FIG. 2 shows an example depot (block 205) and an example data block area (block 210). The depot 205 includes one or more depot slots $215_1 \ldots _M$. Each of the depot slots $215_1 \ldots _M$ contains zero or more data blocks that are currently being written to the data block area 210, zero or more data blocks that were written to the data block area 210, and zero or more data blocks that will be written to the data block area 210 later. For example, depot slot $215_1$ includes data blocks 220 and 225, depot slot $215_2$ includes no data blocks, and depot slots $215_3$ and $215_M$ include one data block each (data blocks 230 and 235, respectively). Each of the data blocks includes information for writing to the data block area 210 and header information. For example, data block 220 includes a Home Disk Address (HDA) and a data block length. The HDA identifies the starting location of the data block in the data block area 210. The data block length identifies the length of the data block. Based on the size of the data blocks, each of the depot slots $215_1 \ldots _M$ may have sufficient capacity to store multiple data blocks. This allows the system to optimize writes to the data block area. Certain example systems, however, allow only one data block per depot slot. In one example depot, all of the depot slots $215_1 \ldots _M$ are of equal size (e.g. 128 KB). In another example depot, the size of the depot slots $215_1 \ldots _M$ is equal to the maximum size of a data block. In such an example depot, data blocks are never split between two depot slots.

Data blocks, such as those shown in FIG. 2, are written to depot slots by the information handling system. In one example system, only data blocks for in-place writes use the depot. After the one or more data blocks are successfully written to a depot slot, the system writes the data blocks to their locations (e.g., indicated by the data block HDA) in the data block area. In FIG. 2, this is shown by arrows mapping the data blocks to their locations in the data block area 210.

The information handling system 100 includes depot control information. An example information handling system 100 includes on-disk depot control information 240, which is stored in the depot 205 or elsewhere in one or more of the DSFs 105, 110, and 115. The example information handling system 100 also includes in-memory depot control information 245, which is stored, for example, in one or more of the controllers 120 and 125, in the client system 150, or elsewhere in the information handling system 100.

The depot control information, which is stored as on-disk depot control information 240 or in-memory depot control information 245, includes the locations of the depot slots $215_1 \ldots _M$. The depot control information also includes information regarding the status of the depot slots $215_1 \ldots _M$. One example system records whether each depot slot is valid or invalid. A depot slot is valid if each data block in the depot could be written to the data block area without changing any data therein. Otherwise, a depot slot is invalid. The example system also records whether each depot slot is FREE (e.g., available to be written to), IN PROGRESS (e.g., one or more data blocks in the depot slot are being written to disk), or ASSIGNED (e.g., one or more data blocks are being written to the depot slot or will be written to the depot slot). Another example system records an assignment table including the HDA and length of data blocks in each of the depot slots $215_{1...M}$.

In certain implementations, the assignment table is stored in the in-memory depot control information 245. The system uses the assignment table to determine where to allocate new data blocks entering the depot and when to change the assignment or validity status of a depot slot. Other example systems do not maintain an assignment table, instead the system scans the depot slots to determine assignment information of the depot slots $215_{1...M}$.

In one example information handling system 100, the depot control information indicating the locations of the depot slots $215_{1...M}$ is stored in the on-disk depot control information 240, while the other depot control information is stored in the in-memory depot control information 245. In other example information handling systems 100, a set of depot control information is stored in the on-disk depot control information 240 while another set of depot control information is stored in the in-memory depot control information 245.

Figure 3:
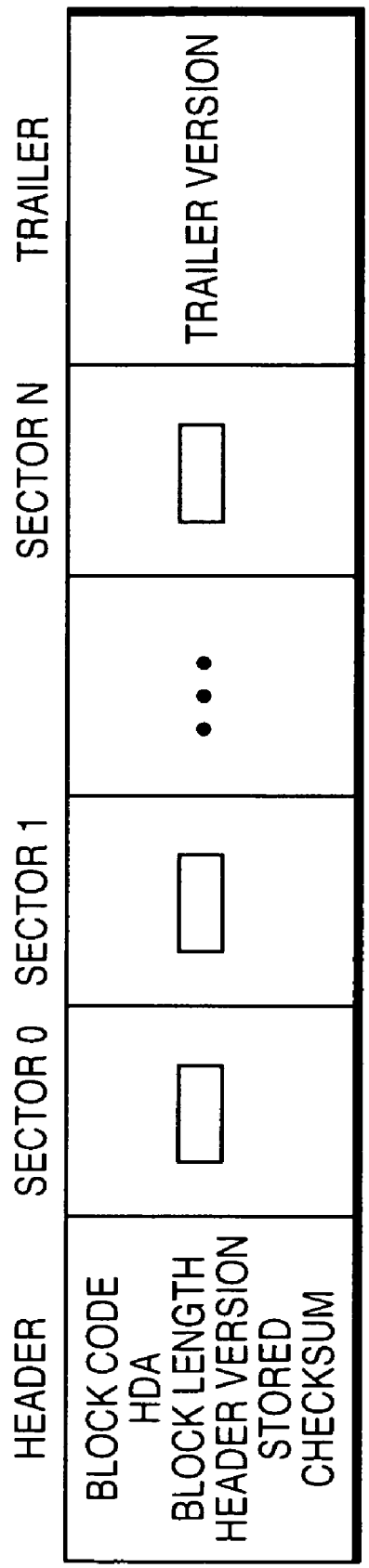
FIG. 3 is a block diagram of data block.

The structure of an example data block is shown in FIG. 3. The example data block includes a header, N sectors of data, and a trailer. The header includes a block code, the HDA, the block length, a header version, and a stored checksum. The trailer includes a trailer version. In one example system, the header and trailer versions are the same value that is written to the start and end of a block of data. As discussed below with respect to FIG. 6, the header and trailer versions are used to check internal data integrity in some example systems. Although the header and trailer are detailed at the start and end of the data block in FIG. 3, other example systems place the header and trailer information elsewhere within the data block. Still other example systems store one or more pieces of header or trailer information outside of the data block (e.g., in a centralized table). Some example systems include only a subset of the header and trailer information shown in the data block in FIG. 2. For example, one example system only maintains a HDA and block length for each data block.

One example information handling system calculates the stored checksum by sampling one or more of data bits (e.g., one 32 bit word) from one or more of the sectors and calculating a checksum. The example system reads the data shown in cross-hatched boxes in the sectors to calculate a checksum.

The information handling system 100 uses one or more depots as a write-ahead logging mechanism. A data block is completely written to a depot slot before it is written to its Home Disk Address in the data block area. The depot slot is not freed until the one or more data blocks in the depot slot are completely written to the data block area. Therefore, the information handling system 100 always has at least one valid copy of a data block. The entries in the depot are invalidated over time. That is, depot slots that contain out-of-date copies of data blocks are invalidated.

Figure 4:
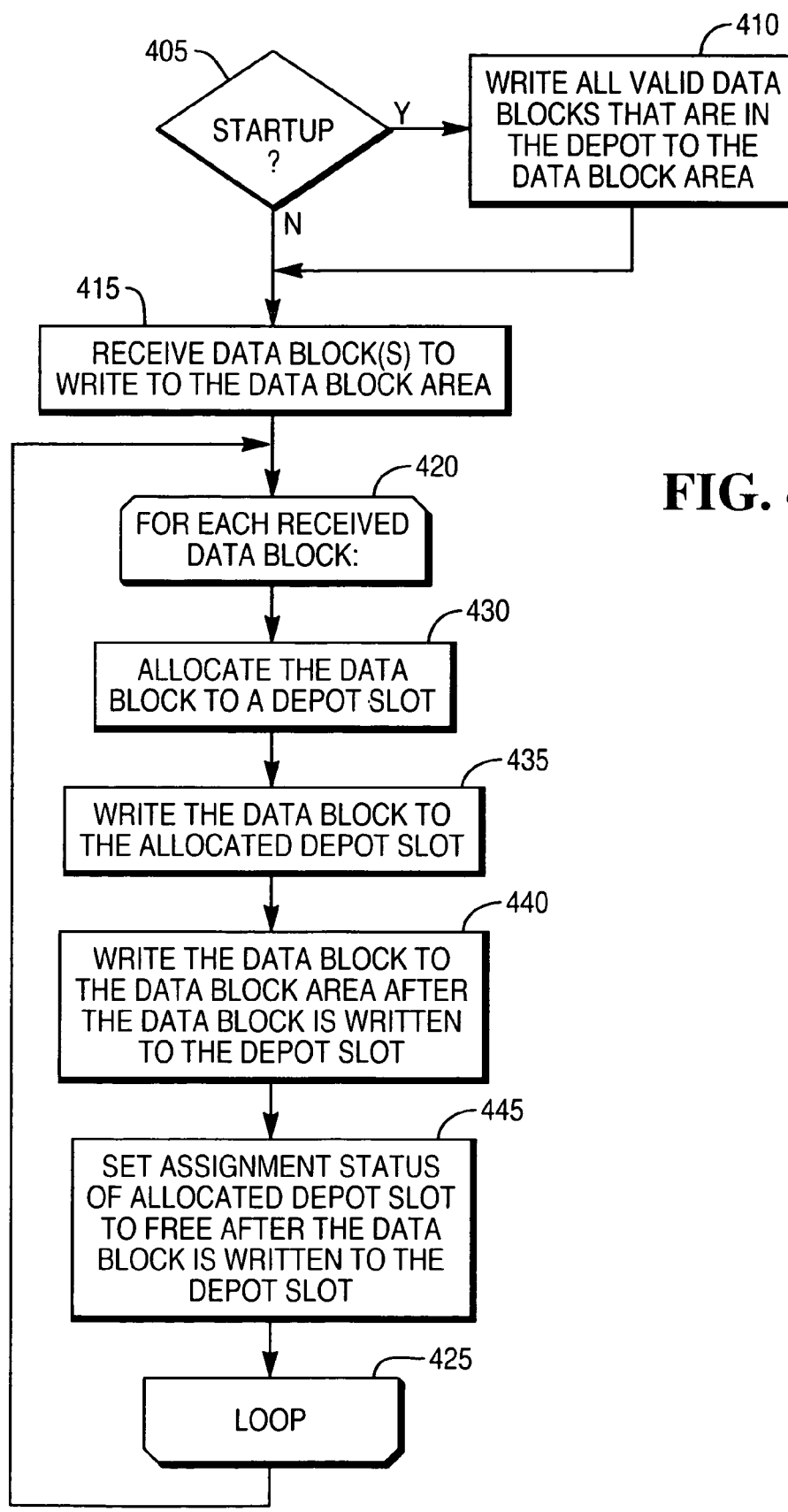
FIGS. 4-9 are flow charts of a system for achieving atomic writes.

A block diagram demonstrating the functionality an example information handling system is shown in FIG. 4. The system determines if it has been started up (block 405). This indicates that the system was restarted (e.g., software or hardware restart) and that there may be data corruption due to an interrupted write. If the system is in startup (block 405), the system writes all valid data blocks that are in the depot to the data block area (block 410, which is shown in greater detail in FIGS. 5-7 and discussed below). If the system is not in startup, the system receives one or more data blocks to write to the data block area (block 415). The system enters a loop (defined by blocks 420 and 425), and loops once for each data block received. Within the loop, the system allocates the data block to a depot slot (block 430, which is shown in greater detail in FIG. 8 and discussed below). The system writes the data block to the allocated depot slot (block 435). After the data block is written to the allocated depot slot, the system writes the data block to the data block area (block 440). The system sets the assignment status of the allocated depot slot to FREE after the data block is written to the depot slot (block 445). In an example system where each depot slot includes two or more data blocks, the system only sets the assignment status of the depot slot to FREE after all of the data blocks in the depot slot are completely written to the data block area.

Figure 5:
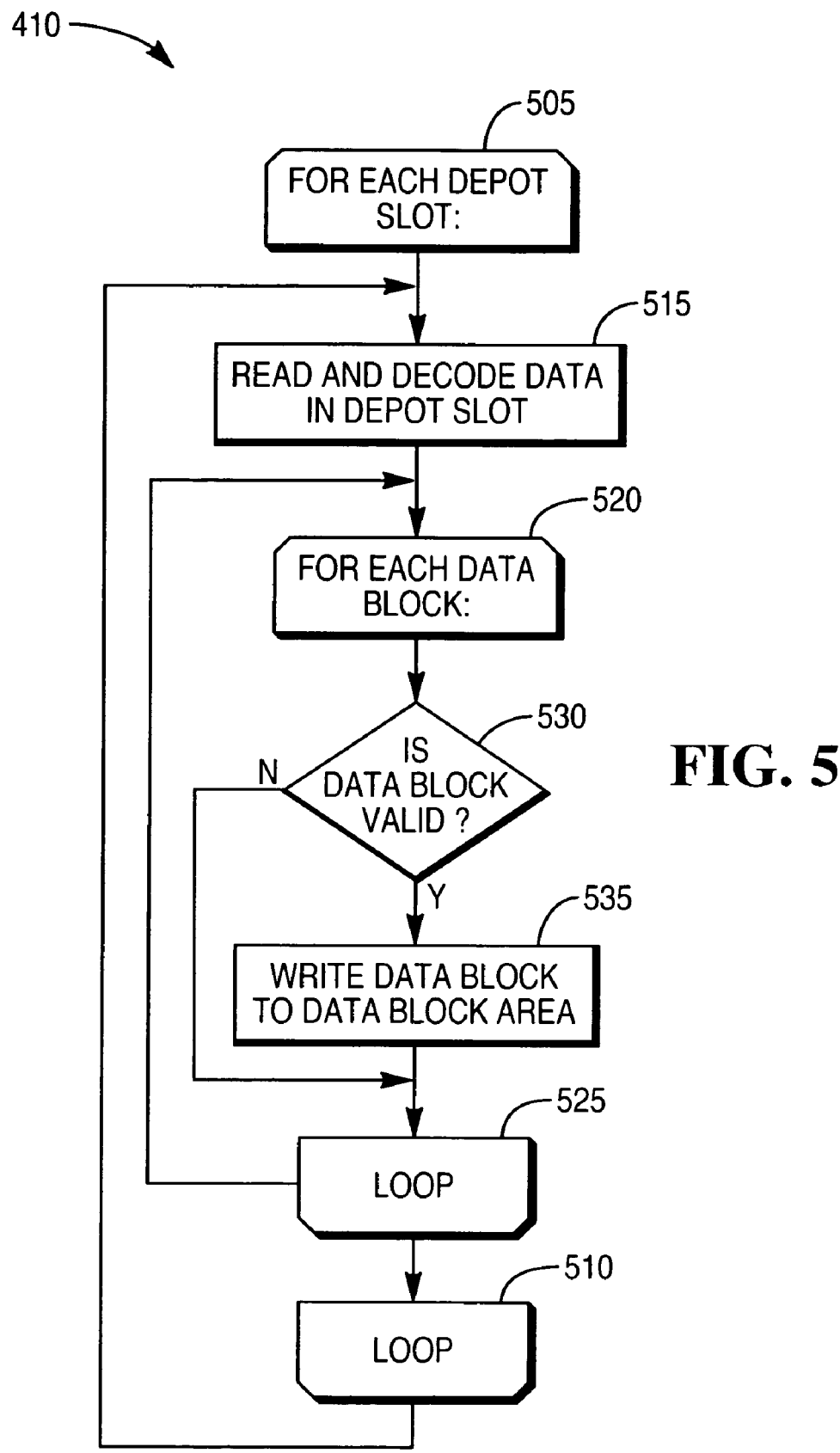

An example system for writing all valid data blocks that are in the depot to the data block area (block 410) is shown in FIG. 5. The system enters a loop defined by blocks 505 and 510 and loops once for each depot slot. Within the loop, the system reads and decodes the data in the depot slots (block 515). Block 515 is optional in certain implementation of the system that do not need to read and decode the data in the depot slot to find the data blocks within the depot slots. For example, some example systems maintain a depot allocation table protected by a in-place-write-avoidance technique or a WAL technique. In such systems, the HDA, length, and validity of the data blocks in the depot can simply be retrieved from the depot allocation table.

The system enters a loop defined by blocks 520 and 525 and loops once for each data block within the depot slot. The system determines if the data block is valid (block 530, which is shown in greater detail in FIG. 6 and discussed below) and, if so, it writes the data block to the data block area (block 535). In one example system, if a depot slot includes two or more data blocks, and any of the data blocks are invalid, the system will not write any of the data blocks to disk.

Figure 6:
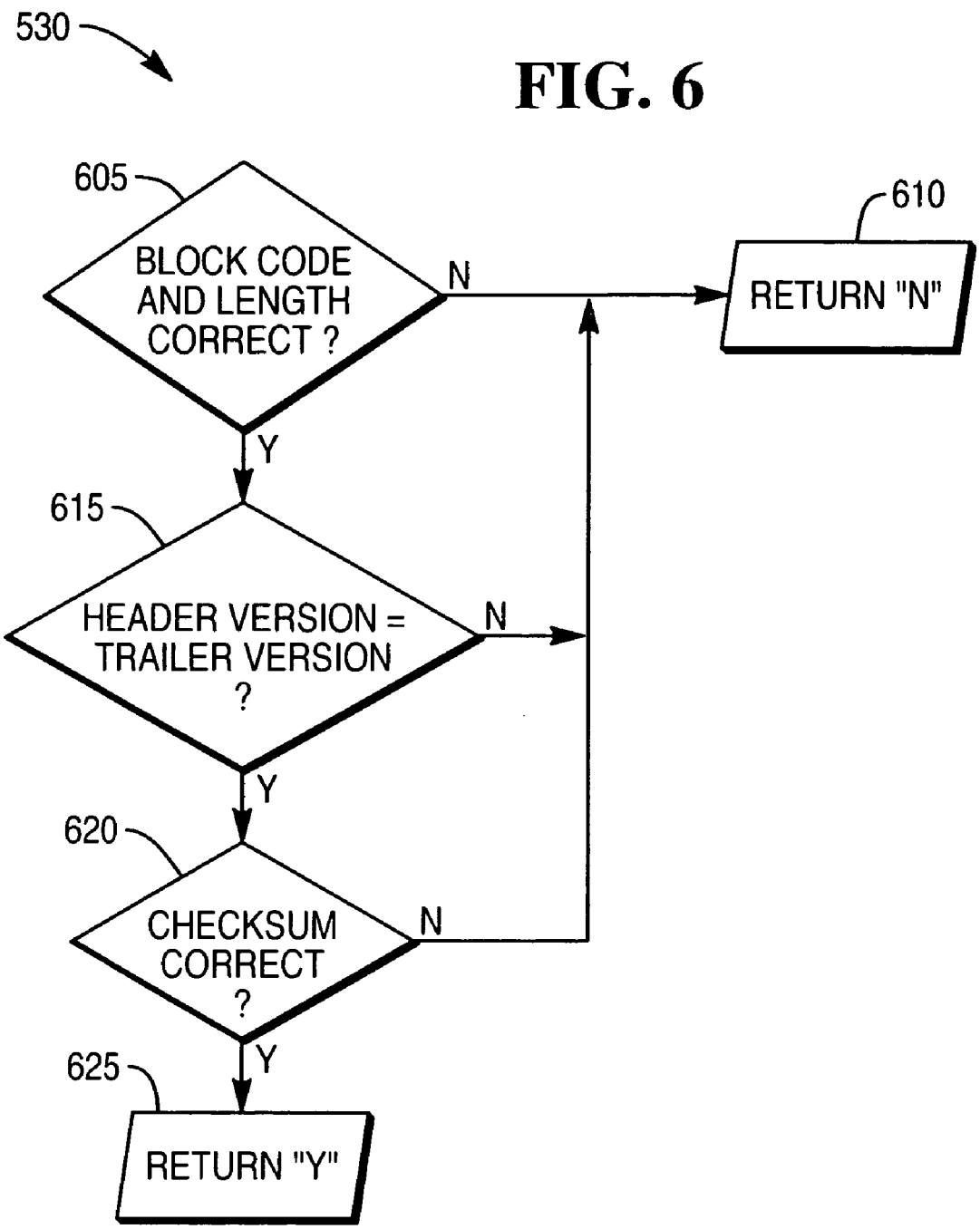

FIG. 6 shows an example system for determining whether a data block found in a depot slot is valid (block 530). Determining the validity of a data block is complicated by the fact that a single data write to a data storage facility may be performed in a non-sequential manner. For example, the trailer of a data block may be written before the header. Consequently, the system performs one or more integrity checks on the data block. The system determines if the recorded values of the block code and the length of the block (e.g., stored in the header) match the actual values of the block code and the length of the block (block 605). The system checks whether the header and trailer versions match (block 615). The system also determines if the stored checksum in the data block matches a recovery checksum (block 620, which is discussed in greater detail with respect to FIG. 7). If none of these integrity checks fail, the system returns "Y" (block 625), otherwise it returns "N" (block 610).

Figure 7:
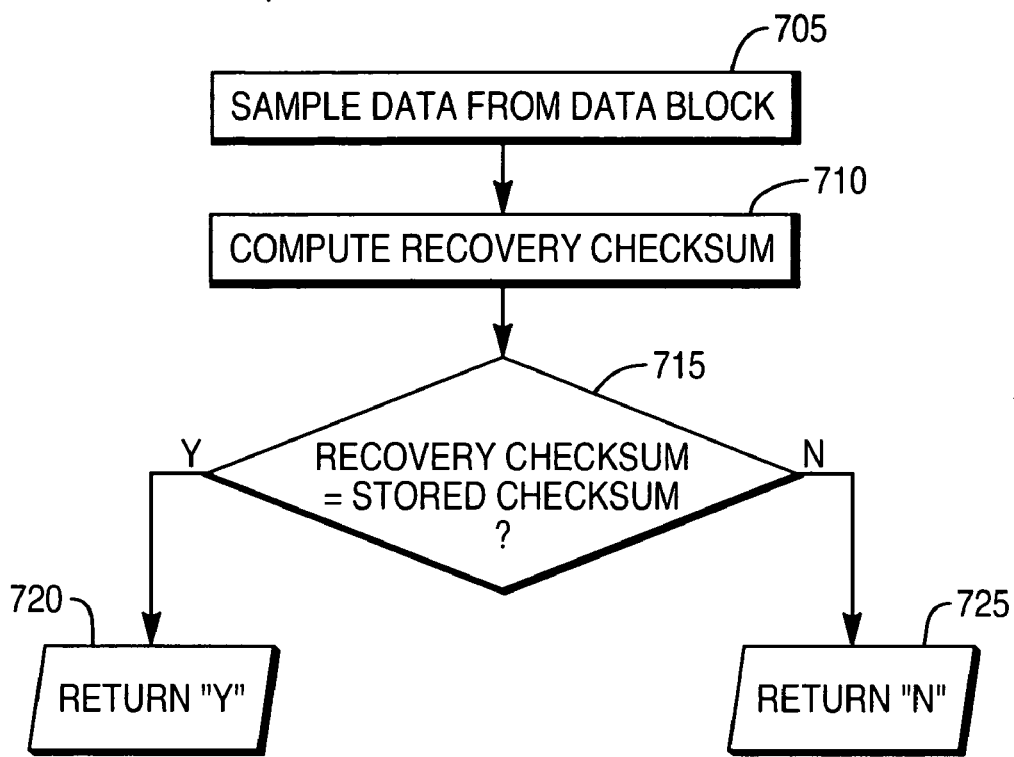

An example system for determining the integrity of a data block using a checksum (block 620) is shown in FIG. 7. The system samples data from the data block (block 705). For example, the system may sample one or more bits from one or more sectors of the data block. Returning to FIG. 2, the system may sample the data in the cross-hatched boxes from each of the sectors of the data block. Using the sampled data, the system computes a recovery checksum (block 710) and compares it with the stored checksum. If the recovery checksum is the same as the stored checksum the system returns "Y" (block 720), otherwise it returns "N" (block 725).

Figure 8:
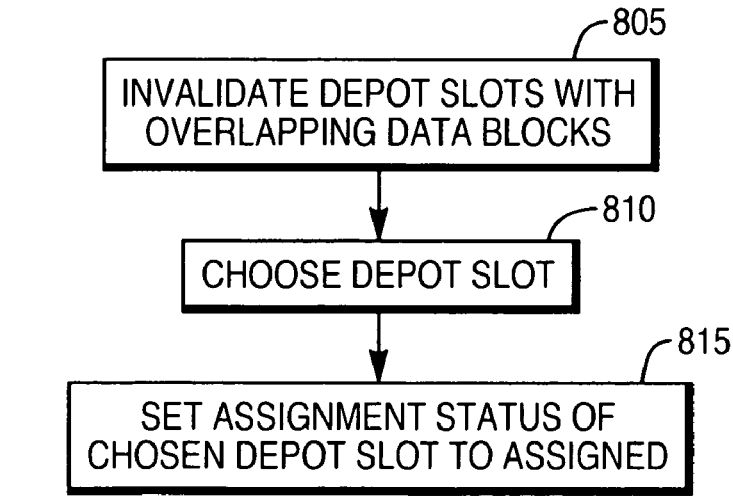

An example system for allocating each data block to a depot slot (block 430 in FIG. 4) is shown in FIG. 8. The system invalidates depot slots with overlapping data blocks (block 805, which is shown in greater detail in FIG. 9 and discussed below). The system then chooses a dept slot (block 810). One example system chooses the first available slot with a FREE assignment status. The system then sets the assignment status of the chosen depot slot to ASSIGNED (block 815).

Figure 9:
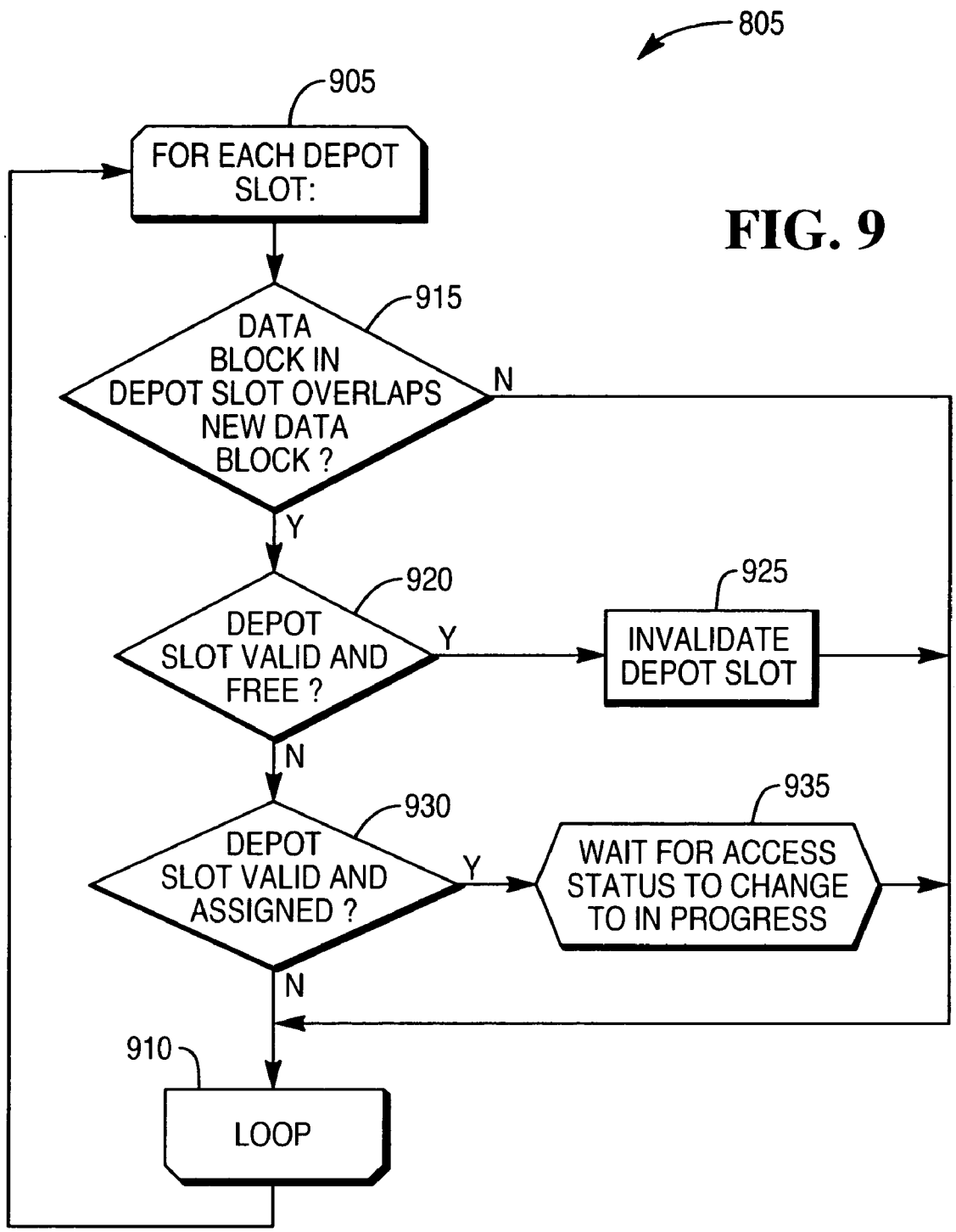

In one example system a depot WAL system is used that allows the system to maintain a log of in-place write that ages. That is, over time, parts of the log (e.g., depot slots) will become invalid and part of the log (e.g. depot slots) will be overwritten. FIG. 9 shows an example system for invalidating one or more depot slots when a new data block being written to the depot would overlap one or more data blocks in the depot slots (block 805). The system scans each of the depot slots (blocks 905 and 910). In certain implementations of the system, only the valid slots are scanned. The system determines if one more data blocks in depot slot overlap the new data block (block 915). A data block overlaps the new data block if the data blocks would share any common location in the data block area. One example system makes this determination by considering the HDA (e.g., the starting location on the data block area) and the length of the block to determine the area spanned by the data block. These areas are compared to determine overlap. If a depot slot includes one or more overlapping data blocks, the system determines if the depot slot is valid and has a FREE access status (block 920), and if so the system invalidates the depot slot (block 925). One example system invalidates a depot slot by writing a string of 0's over a sector of a data block in the depot slot. Another example system may set the status of the depot slot, stored in the depot control information, to invalid. If the depot slot is valid and has an access status of ASSIGNED, the system waits for the access status to change to IN PROGRESS (block 935). This prevents the system from invalidating a data slot that has not been completely written from the depot to the data block area.

Figure 10:
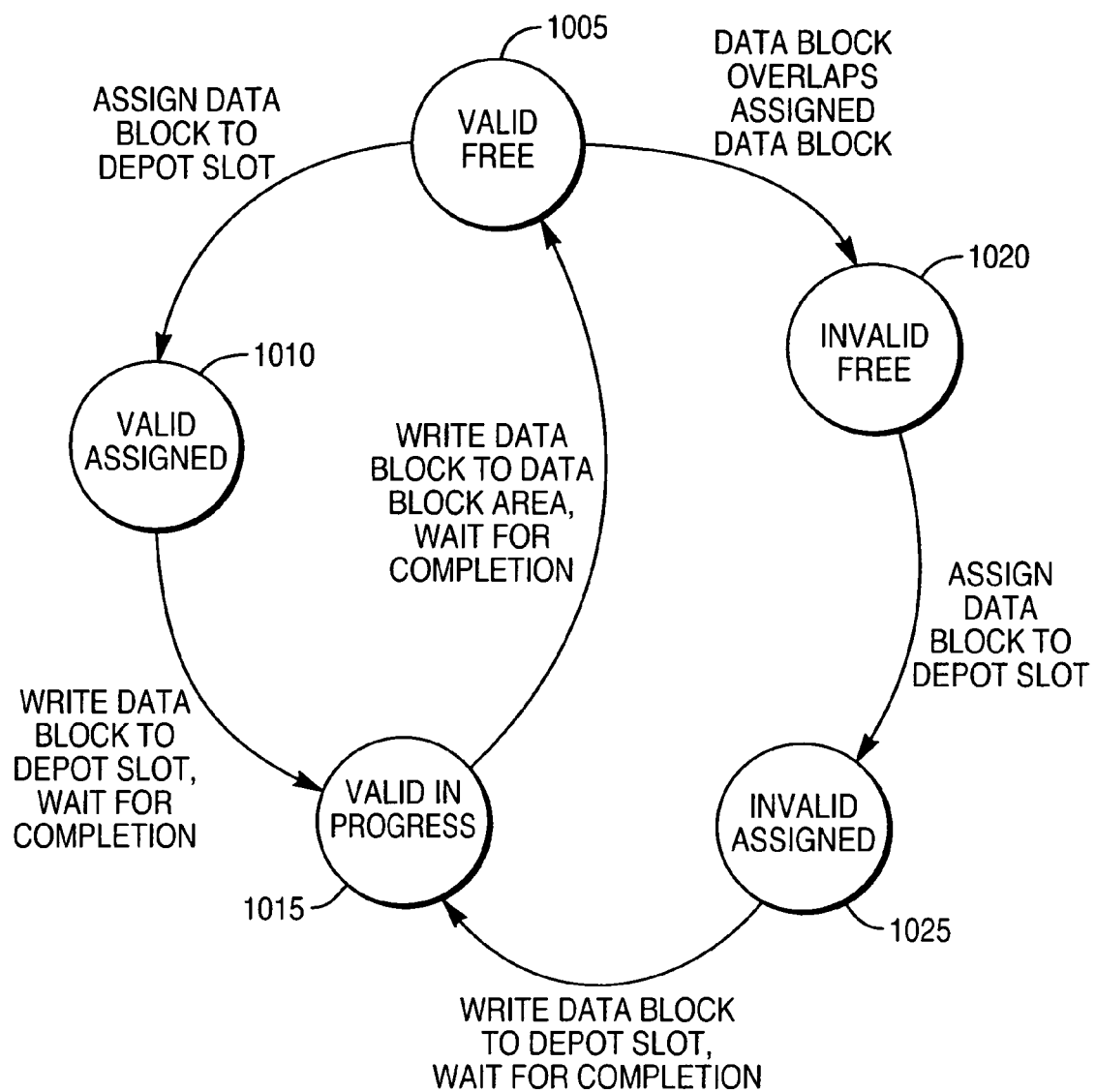
FIG. 10 is a state diagram of a depot slot.

A state diagram of a depot slot in an example information handling system 100 is shown in FIG. 10. Each depot slot is characterized by a validity status (e.g., valid or invalid) and an access status (e.g., FREE, ASSIGNED, and IN PROGRESS). A data block can only be assigned to a depot slot with a FREE access status, such as the depot slot characterized by state 1005. After a data block is ASSIGNED to the depot slot its access status changes to ASSIGNED (state 1010). Once the data block is successfully and completely written to the depot slot the access status of the slot change to IN PROGRESS (state 1015). After the data block is successfully and completely written to the data block area the access status returns to FREE (state 1005). While a depot slot is valid and FREE, it will become invalid and FREE (state 1020) if it includes a data block that overlaps with a data block written to the depot. If a new data block is assigned to the depot slot its access status changes to ASSIGNED (state 1025). After the data block is successfully and completely written to the depot slot, the depot slot will be valid and will have an IN PROGRESS access status (state 1015).

In certain implementations where the depot slot includes two or more data blocks, the access status of the depot slot changes to FREE (state 1005) only after all data blocks in the depot slot are successfully and completely written to the data block area.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing an atomic write to a data block area, where the atomic write is an in-place write, the method including:
   receiving one or more data blocks to write to the data block area; and
   for one or more received data blocks:
      writing the data block to a depot; and
      writing the data block to the data block area after the data block write to the depot is completed; and
   writing all valid data blocks that are in the depot to the data block area during startup;
   wherein the depot includes one or more slots, each slot including zero or more data blocks, where each of the data block is valid or invalid, and where writing all valid data block that are in a depot to the data block area includes:
      determining which depot slots include valid data blocks; and
      writing the valid data blocks in the depot to the data block area.

2. The method of claim 1, where each data block includes a version that is written to the beginning and end of the data block, and where determining which depot slots include valid data blocks includes:
   for each depot slot:
      reading and decoding data in the depot slot; and
      for each data block in the depot slot:
         comparing the version at the beginning of the data block with the version at the end of the data block, and if they are equal:
            determining that the data block is valid;
         otherwise:
            determining that the data block is invalid.

3. The method of claim 1, where each data block corresponds to a stored checksum, and where determining which depot slots include valid data blocks includes:
   for each depot slot:
      reading and decoding data in the slot; and
      for each data block in the slot:
         determining a recovery checksum of the data block;
         comparing the recovery checksum and the stored checksum, and if they match:
            determining that the data block is valid;
         otherwise:
            determining that the data block is invalid.

4. The method of claim 1, where each data block includes a starting location in the data block area, and where writing the valid data blocks in the depot to the data block area includes:
   for each valid data block:
      writing the data block to the data block area at the starting location.

5. The method of claim 1, where each depot slot has an assignment status of FREE, ASSIGNED, or IN PROGRESS, where each data block includes a starting location in the data block area, and where writing the data block to the data block area includes:
   writing the data block to the data block area at the starting location.

6. The method of claim 5, including:
setting the assignment status of the depot slot to FREE after all data blocks in the depot slot are completely written to the data block area.

7. A method of performing an atomic write to a data block area, where the atomic write is an in-place write, the method including:
receiving one or more data blocks to write to the data block area; and
for one or more received data blocks:
writing the data block to a depot; and
writing the data block to the data block area after the data block write to the depot is completed;
wherein the depot includes one or more slots, and for each data block received, the method includes the steps of:
allocating the data block to a depot slot; and
invalidating zero or more overlapping data blocks in depot slots.

8. The method of claim 7, including:
characterizing each depot block with an assignment status of FREE, ASSIGNED, or IN PROGRESS;
choosing a depot slot that has a FREE assignment status; and
setting the assignment status of the chosen depot slot to ASSIGNED.

9. The method of claim 8, where each data block includes a starting location in the data block area and a length, where two data blocks overlap if they would share any location in the data block area, and where invalidating zero or more overlapping data blocks includes:
for each valid depot slot:
if a data block in the depot slot overlaps a new data block:
if the assignment status of the depot slot is FREE:
invalidating the depot slot;
if the assignment status of the depot slot is ASSIGNED:
invalidating the depot slot after the assignment status changes to IN PROGRESS.

10. A computer program, stored on a tangible storage medium, for use in performing an atomic write to a data block area, where the atomic write is an in-place write, the computer program including executable instructions that cause a computer to:
receive one or more data blocks to write to the data block area; and
for one or more data blocks received:
write the data block to a depot; and
write the data block to the data block area after the data block write to the depot is completed; and
write all valid data blocks that are in a depot to the data block area during startup;
wherein the depot includes one or more slots, each slot including zero or more data blocks, where each of the data block is valid or invalid, and where the executable instruction that cause the computer to write all valid data block that are in a depot to the data block area further cause the computer to:
determine which depot slots include valid data blocks; and
write the valid data blocks in the depot to the data block area.

11. The computer program of claim 10, where each data block includes a version that is written to the beginning and end of the data block, and where the executable instruction that cause the computer to determine which depot slots include valid data blocks further cause the computer to:
for each depot slot:
read and decode data in the depot slot; and
for each data block in the depot slot:
compare the block code at the beginning of the data block with the version at the end of the data block, and if they are equal:
determine that the data block is valid;
otherwise:
determine that the data block is invalid.

12. The computer program of claim 10, where each data block corresponds to a stored checksum, and where the executable instruction that cause the computer to determine which depot slots include valid data blocks further cause the computer to:
for each depot slot:
reading and decoding data in the slot; and
for each data block in the slot:
determine a recovery checksum of the data block;
compare the recovery checksum and the stored checksum, and if they match:
determine that the data block is valid;
otherwise:
determine that the data block is invalid.

13. The computer program of claim 10, where each data block includes a starting location in the data block area, and where the executable instruction that cause the computer to write the valid data blocks in the depot to the data block area further cause the computer to:
for each valid data block:
write the data block to the data block area at the starting location.

14. The computer program of claim 10, where each depot slot has an assignment status of FREE, ASSIGNED, or IN PROGRESS, where each data block includes a starting location in the data block area, and where the executable instruction that cause the computer to write the data block to the data block area further cause the computer to:
write the data block to the data block area at the starting location.

15. The computer program of claim 14, where the executable instruction further cause the computer to:
set the assignment status of the depot slot to FREE after all data blocks in the depot slot are completely written to the data block area.

16. A computer program, stored on a tangible storage medium, for use in performing an atomic write to a data block area, where the atomic write is an in-place write, the computer program including executable instructions that cause a computer to:
receive one or more data blocks to write to the data block area; and
for one or more data blocks received:
write the data block to a depot; and
write the data block to the data block area after the data block write to the depot is completed; and
wherein the depot includes one or more slots, and for each data block received, the computer program includes executable instructions that cause a computer to:
allocating the data block to a depot slot; and
invalidate zero or more overlapping data blocks in depot slots.

17. The computer program of claim 16, where the executable instruction further cause the computer to:
characterize each depot block with an assignment status of FREE, ASSIGNED, or IN PROGRESS;

choose a depot slot that has a FREE assignment status; and
set the assignment status of the chosen depot slot to ASSIGNED.

18. The computer program of claim 17, where each data block includes a starting location in the data block area and a length, where two data blocks overlap if they would share any location in the data block area, and where the executable instruction that cause the computer to invalidate zero or more overlapping data blocks further cause the computer to:
for each valid depot slot:
if a data block in the depot slot overlaps a new data block:
if the assignment status of the depot slot is FREE:
invalidate the depot slot;
if the assignment status of the depot slot is ASSIGNED:
invalidate the depot slot after the assignment status changes to IN PROGRESS.

19. An information handling system including:
one or more controllers;
one or more data storage facilities, each of the one or more controllers providing access to one or more data storage facilities;
one or more depots each including one or more depot slots, where the depots are stored in one or more of the data storage facilities;
one or more data block areas stored in one or more of the data storage facilities;
a client system to access one or more data storage facilities through one or more controllers, the workstation including one or more input devices and one or more output devices; and
a process for execution on one or more of the controllers for achieving atomic writes, the process including:
receiving one or more data blocks to write to the data block area; and
for each data block received:
writing the data block to the depot slot;
writing the data block to the data block area after the data block write to the depot slot is completed; and
writing all valid data blocks that are in a depot to the data block area during startup;
wherein each depot slot includes zero or more data blocks, where each of the data blocks is valid or invalid, and where writing all valid data blocks that are in a depot to the data block area includes:
determining which depot slots include valid data blocks; and
writing the valid data blocks in the depot to the data block area.

20. The information handling system of claim 19, where each data block includes a version that is written to the beginning and end of the data block, and where determining which depot slots include valid data blocks includes:
for each depot slot:
reading and decoding data in the depot slot; and
for each data block in the depot slot:
comparing the version at the beginning of the data block with the version at the end of the data block, and if they are equal:
determining that the data block is valid;
otherwise:
determining that the data block is invalid.

21. The information handling system of claim 19, where each data block corresponds to a stored checksum, and where determining which depot slots include valid data blocks includes:
for each depot slot:
reading and decoding data in the slot; and
for each data block in the slot:
determining a recovery checksum of the data block;
comparing the recovery checksum and the stored checksum, and if they match:
determining that the data block is valid;
otherwise:
determining that the data block is invalid.

22. The information handling system of claim 19, where each data block includes a starting location in the data block area, and where writing the valid data blocks in the depot to the data block area includes:
for each valid data block:
writing the data block to the data block area at the starting location.

23. An information handling system including:
one or more controllers;
one or more data storage facilities, each of the one or more controllers providing access to one or more data storage facilities;
one or more depots each including one or more depot slots, where the depots are stored in one or more of the data storage facilities;
one or more data block areas stored in one or more of the data storage facilities;
a process for execution on one or more of the controllers for achieving atomic writes, the process including:
receiving one or more data blocks to write to the data block area; and
for each data block received:
writing the data block to the depot;
allocating the data block to a depot slot;
invalidating zero or more overlapping data blocks in depot slots; and
writing the data block to the data block area after the data block write to the depot slot is completed.

24. The information handling system of claim 23, where the process includes:
characterizing each depot block with an assignment status of FREE, ASSIGNED, or IN PROGRESS;
choosing a depot slot that has a FREE assignment status; and
setting the assignment status of the chosen depot slot to ASSIGNED.

25. The information handling system of claim 24, where each data block includes a starting location in the data block area and a length, where two data blocks overlap if they would share any location in the data block area, and where invalidating zero or more overlapping data blocks includes:
for each valid depot slot:
if a data block in the depot slot overlaps a new data block:
if the assignment status of the depot slot is FREE:
invalidating the depot slot;
if the assignment status of the depot slot is ASSIGNED:
invalidating the depot slot after the assignment status changes to IN PROGRESS.

26. The information handling system of claim 24, where each depot slot has an assignment status of FREE, ASSIGNED, or IN PROGRESS, where each data block includes a starting location in the data block area, and where writing the data block to the data block area includes:
   writing the data block to the data block area at the starting location.

27. The information handling system of claim 26, including:
   setting the assignment status of the depot slot to FREE after all data blocks in the depot slot are completely written to the data block area.

* * * * *